United States Patent
Allen et al.

(10) Patent No.: US 10,090,955 B2
(45) Date of Patent: *Oct. 2, 2018

(54) SELECTIVE DIRECTIONAL MITIGATION OF WIRELESS SIGNAL INTERFERENCE

(71) Applicant: International Business Machines Corporation, Armonk, NY (US)

(72) Inventors: Ira L. Allen, Dallas, TX (US); Lambert S. Berentsen, Jonestown, TX (US); Gregory J. Boss, Saginaw, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,332

(22) Filed: Oct. 10, 2017

(65) Prior Publication Data

US 2018/0048411 A1  Feb. 15, 2018

Related U.S. Application Data

(63) Continuation of application No. 15/232,608, filed on Aug. 9, 2016, now Pat. No. 9,831,974.

(51) Int. Cl.
*H04B 1/10* (2006.01)
*H04J 11/00* (2006.01)

(52) U.S. Cl.
CPC .................................. *H04J 11/003* (2013.01)

(58) Field of Classification Search
CPC . H04J 11/0023; H04W 84/12; H04W 52/243; H04B 15/02; H04B 1/10
See application file for complete search history.

(56) References Cited

U.S. PATENT DOCUMENTS 7,899,006 B2  3/2011  Boyd
8,340,034 B1  12/2012  Lee et al.
(Continued)

FOREIGN PATENT DOCUMENTS

WO  2010001320 A1  1/2010
WO  2015174801 A1  11/2015

OTHER PUBLICATIONS

Lu Zhaogan, et al., Interfering Issue in High Density WIFI Hotspot Area and its Way out, Journal of Applied Sciences, 2014, pp. 601-608 (plus cover page), vol. 14, Issue 7, Asian Network for Scientific Information, P. R. China.

(Continued)

*Primary Examiner* — Nguyen Vo
(74) *Attorney, Agent, or Firm* — Lee Law, PLLC; Christopher B. Lee

(57) ABSTRACT

A boundary of a wireless network is monitored for incoming wireless signals that may interfere with an ability of a first wireless computing device to connect to the wireless network within the boundary of the wireless network. For an incoming wireless signal determined to interfere with the ability of the first wireless computing device to connect to the wireless network within the boundary of the wireless network, a directional opposing outgoing wireless signal is emitted to counteract the incoming wireless signal and to stop the incoming wireless signal from further interfering with the ability of the first wireless computing device to connect to the wireless network within the boundary of the wireless network.

18 Claims, 7 Drawing Sheets

(56) References Cited

U.S. PATENT DOCUMENTS

| 8,798,549 | B2 | 8/2014 | Kanauchi |
| 8,917,647 | B2 | 12/2014 | Nentwig |
| 9,831,974 | B1* | 11/2017 | Allen ................ H04J 11/0023 |
| 2009/0286496 | A1 | 11/2009 | Yavuz et al. |
| 2011/0039496 | A1 | 2/2011 | Chueh et al. |
| 2012/0058729 | A1 | 3/2012 | Chang et al. |
| 2014/0274093 | A1 | 9/2014 | Abdelmonem |
| 2015/0063340 | A1 | 3/2015 | Cai et al. |
| 2015/0200721 | A1 | 7/2015 | Hwang et al. |
| 2015/0336463 | A1* | 11/2015 | Boyer ................ H04B 5/0037 320/108 |
| 2016/0057580 | A1 | 2/2016 | Fischer et al. |

OTHER PUBLICATIONS

John Cox, Spectrum analysis to be built-into Aruba's Wi-Fi product line, Apr. 14, 2010, pp. 1-3, Network World, Published at: http://www.networkworld.com/article/2207019/wireless/spectrum-analysis-to-be-built-into-aruba-s-wi-fi-product-line.html.

Craig Mathias, Analyze this: Low-cost wireless spectrum analyzers do the trick, Mar. 23, 2009, pp. 1-7, Network World, Published at: http://www.networkworld.com/article/2264560/wireless/analyze-this--low-cost-wireless-spectrum-analyzers-do-the-trick.html.

Author Unknown, ArubaOS Wireless Intrusion Protection Module, Data Sheet, 2007, pp. 1-2, Aruba Networks, Inc., Published at: http://www.arubanetworks.com/pdf/products/DS_WIP.pdf.

Jeff Bertolucci, Six Things That Block Your Wi-Fi and How to Fix Them, May 16, 2011, pp. 1-4, PCWorld, Published at: http://www.pcworld.com/article/227973/six_things_that_block_your_wifi_and_how_to_fix_them.html.

Author Unknown, Rogue Management in a Unified Wireless Network, Aug. 10, 2010, pp. 1-26, Cisco, Published at: http://www.cisco.com/c/en/us/support/docs/wireless/4400-series-wireless-lan-controllers/112045-handling-rogu.e-cuwn-00.html#RM.

Shalene Gupta, Marriott settles complaint that it blocked guest wi-fi hotspots, Oct. 3, 2014, pp. 1-5, Fortune.com, Published at: http://fortune.com/2014/10/03/marriott-settles-complaint-that-it-blocked-guest-wi-fi-hotspots/.

Author Unknown, Jammer Enforcement, Federal Communications Commission Public Notice, Dec. 8, 2014, pp. 1-3, FCC, Published at: https://www.fcc.gov/general/jammer-enforcement.

Author Unknown, How does RSSI (dBm) relate to signal quality (percent)?, Printed on Jul. 29, 2016, pp. 1-2, SpeedGuide.net, Published at: http://www.speedguide.net/faq/how-does-rssi-dbm-relate-to-signal-quality-percent-439.

Vangie Beal, Wi-Fi Definition is Not Wireless Fidelity, Webopedia.com, Jul. 14, 2010, pp. 1-3, Quinstreet Inc., Published at: http://www.webopedia.com/DidYouKnow/Computer_Science/wifi_explained.asp.

Author Unknown, Wi-Fi, Wikipedia.org, Aug. 8, 2016, pp. 1-19, Wikimedia Foundation, Inc., Published at: https://en.wikipedia.org/wiki/Wi-Fi.

Author Unknown, Wi-Fi Alliance, Webopedia.com, Printed on Aug. 9, 2016, pp. 1-3, Quinstreet Inc., Published at: http://www.webopedia.com/TERM/W/Wi_Fi_Alliance.html.

United States Patent and Trademark Office, Office Action for U.S. Appl. No. 15/232,608, dated Mar. 17, 2017, pp. 1-16, Alexandria, VA, USA.

United States Patent and Trademark Office, Notice of Allowance for U.S. Appl. No. 15/232,608, dated Jul. 19, 2017, pp. 1-5, Alexandria, VA, USA.

IBM, List of IBM Patents or Patent Applications Treated as Related, Applicant Appendix, Oct. 10, 2017, pp. 1-2, the contents of which are incorporated herein by reference in their entirety.

* cited by examiner

SELECTIVE DIRECTIONAL MITIGATION OF WIRELESS SIGNAL INTERFERENCE

BACKGROUND

The present invention relates to wireless signal interference. More particularly, the present invention relates to selective directional mitigation of wireless signal interference.

Wireless routers, such as those that operate using the IEEE 802.11b wireless networking protocol (e.g., WiFi routers, etc.), and wireless local area networks (WLANs) provide a connection point to a network, and operate by generation and reception of wireless signaling usable by computing devices for wireless connection to and communication over the network. By use of a wireless router or WLAN, computing devices do not require a physical network cable to interconnect to the respective network.

SUMMARY

A computer-implemented method includes, by a wireless zone protection system, monitoring a boundary of a wireless network for incoming wireless signals that may interfere with an ability of a first wireless computing device to connect to the wireless network within the boundary of the wireless network; and for an incoming wireless signal determined to interfere with the ability of the first wireless computing device to connect to the wireless network within the boundary of the wireless network, emitting a directional opposing outgoing wireless signal to counteract the incoming wireless signal and to stop the incoming wireless signal from further interfering with the ability of the first wireless computing device to connect to the wireless network within the boundary of the wireless network.

A system that performs the computer-implemented method and a computer program product that causes a computer to perform the computer-implemented method are also described.

DETAILED DESCRIPTION

Figure 1:
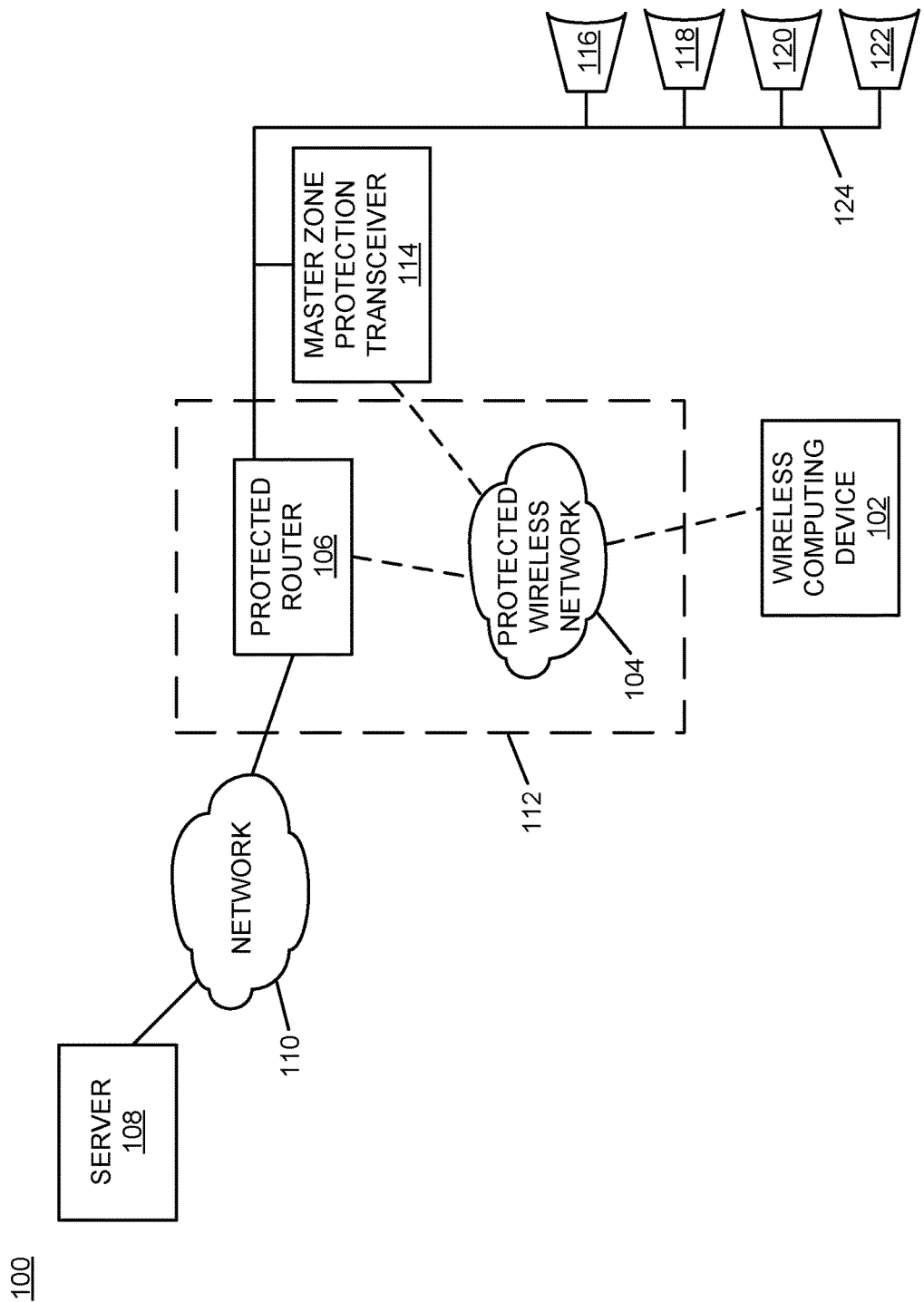
FIG. 1 is a block diagram of an example of an implementation of a system for selective directional mitigation of wireless signal interference according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides selective directional mitigation of wireless signal interference. The present technology solves a recognized interference problem that occurs in association with wireless routers, such as those that operate using the IEEE 802.11b wireless networking protocol (e.g., WiFi routers, etc.), and wireless local area networks (WLANs). The technology described herein provides a new form of signal interference mitigating computing devices and system that operatively monitor a boundary of a protected wireless network and detect incoming wireless signals that are originating from a neighboring wireless network that are determined to be capable of causing network interference within the protected wireless network. As individual interference-producing wireless signals are detected, the signal interference mitigating computing devices determine an interfering signal source direction from which these interfering signals are propagating. The signal interference mitigating computing devices selectively counteract the incoming interfering signals by generating an outgoing directional interference mitigation signal in the direction from which the detected interfering signal is propagating.

The signal interference mitigating computing devices may also detect the signal strength of the incoming interfering signals at the boundary of the protected wireless network/zone, and may generate the directional interference mitigation signal at a power level that matches the detected incoming signal strength of the incoming interfering signals. By power matching the directional interference mitigation signal to the detected incoming power level at the boundary of the protected wireless network, the signal interference mitigating computing devices effectively limit further propagation of the interfering signal into the protected wireless network, without jamming or otherwise destroying the interfering wireless signal as it propagates in other directions. Additionally, it should be noted that the power level of the interfering signal increases in the direction of the interfering signal source relative to the power level of the directional outgoing interference mitigation signal that decreases in power as it directionally propagates in the direction of the interfering signal source, As a result, the effects of the directional outgoing interference mitigation signal decrease within the interfering network with increasing distance from the boundary of the protected wireless network. As an additional variation, and as described in more detail below, the generated directional interference mitigation signal may not be generated at a power level that matches to the incoming interfering signal. The local protected router may communicate through an interference mitigation feedback loop, as described in more detail below, with neighboring protected routers to determine where each router's respective client devices are located. If the interfering signal/router has a client near the border of the local protected zone and the local protected zone router has no clients near that border, then the local protected master zone router/transceiver may instruct the boundary transceiver(s) to produce a smaller or no counter signal since the interfering signal is not currently causing connection difficulties by any local protected zone client devices and may be helping the neighboring client devices connected to the neighboring protected router. However, if a protected zone has a client device that is moved closer to the border of the local protection zone, the local protected master zone router/transceiver may instruct the boundary transceiver(s) to increase the power level of the interference mitigation signal to maintain acceptable bandwidth/connection signal strength for the moving client device.

As such, the new signal interference mitigating computing devices/system described herein may thereby reduce and/or eliminate further interference from neighboring wireless networks without destroying the utility of the interfering signal and the neighboring wireless networks in other directions or within the interfering/neighboring network(s). The technology described herein allows multiple WiFi and WLAN networks (wireless networks generally herein) to operate more efficiently in close proximity to one another while still providing their intended services within a continually-increasing density of wireless routers and signaling devices. A variety of interference mitigation techniques are described herein, and each technique operates to mitigate wireless network interference within a protected wireless network caused by neighboring wireless networks.

The technology described herein operates by monitoring a boundary of a wireless network for incoming wireless signals that may interfere with an ability of a wireless computing device to connect to the wireless network within the boundary of the wireless network. For an incoming wireless signal determined to interfere with the ability of the wireless computing device to connect to the wireless network within the boundary of the wireless network, the technology further operates by emitting a directional opposing outgoing wireless signal to counteract the incoming wireless signal and to stop the incoming wireless signal from further interfering with the ability of the wireless computing device to connect to the wireless network within the boundary of the wireless network.

It should be noted that while the present description utilizes the term "connect" with reference to wireless computing devices experiencing interference with an ability to connect to a protected wireless network, the term "connect" is also intended to encompass communication difficulties or problems. For example, interference with an ability of a wireless computing device to connect to a protected wireless network may include degradation of performance or strength of connectivity that causes dropped packets, intermittent signal strength that results in repeated negotiation for reconnection, or any other form of wireless connection difficulty that may be caused by wireless interference. As described in more detail below, the present subject matter monitors the periphery or boundary of a protected wireless network/zone for incoming interfering signals and effectively mitigates (e.g., operates to cancel/counteract further propagation of) those signals using the directional interference mitigation signal directed at the source of the interference. By additionally determining a minimally invasive power setting of the directional interference mitigation signal that effectively stops further propagation of the interfering wireless signal into the protected network, the interference mitigation activities may reduce impact on the neighboring wireless network that is the source of the interference.

The generated directional interference mitigation signal is alternatively termed a "directional opposing outgoing wireless signal" and is defined herein as an out-of-phase/inverted signal that is opposite in phase relative to a detected incoming interfering signal, and that is generated in a focused manner directed toward the interfering signal source direction to affect a physical cancellation of the interfering signal at a boundary of a protected wireless network/zone, and to mitigate and/or stop further propagation of the incoming interfering signal into the protected wireless network/zone. Where the directional interference mitigation signal is generated at a power level that matches a detected power level of the interfering signal to further limit the effects of the directional interference mitigation signal on neighboring wireless networks, the directional interference mitigation signal is alternatively termed a "directional minimally-invasive power level interference mitigation signal." The terms "directional interference mitigation signal," "directional opposing outgoing wireless signal," "directional mitigation signal," and "directional out-of-phase/inverted interference mitigation signal" are used interchangeably within the present description for ease of description purposes with the understanding that these terms apply equally to either variation of the generated directional interference mitigation signal (e.g., either being or not being generated at the minimally-invasive power level) as appropriate for a given implementation of the description herein, and as specifically differentiated within the claims that follow. Further, it should be noted that the directional interference mitigation signal may initially be generated at a default or other initial power level, and may thereafter be dynamically adjusted in power to be generated at a power level that matches a detected power level of the interfering signal.

Received signal strength indication (RSSI) or other technologies may be used to determine the power level of the incoming interfering signal and to monitor power levels of generated directional mitigation signals. Any suitable implementation and/or combination of these types of technologies may be used, as appropriate for a given implementation.

To achieve the directional mitigation of incoming wireless interference, a perimeter/boundary may be established around a given "protected" router's effective operational zone (hereinafter alternatively the "protected zone"). Wireless directional zone protection boundary transceivers may operate as boundary signal sensors and boundary signal blockers, and as such establish a wireless geofence that surrounds the protected wireless network. The wireless directional zone protection boundary transceivers may be deployed along the periphery or boundary of this protected zone, and are alternatively referred to herein as "boundary transceivers" or "boundary sensors" as appropriate for the particular aspect of the following description.

The wireless directional zone protection boundary transceivers may be moveably mounted and oriented to detect and mitigate foreign wireless signals that enter the protected zone from the different directions relative to which the boundary transceivers are oriented (e.g., from above, below, North, South, East, and West, or otherwise as appropriate). Servo motors or other technology may be utilized to control the positioning and operative direction of the boundary transceivers.

The boundary transceivers may detect interference-causing incoming wireless signaling, and may determine a direction and a power level of the interfering wireless signaling at their respective locations along the boundary of the protected zone. The boundary transceivers may coordinate with a master zone protection transceiver (also alternatively termed the "master transceiver" or "master sensor" as appropriate). The master zone protection transceiver may be situated in communication with the protected router, and may be situated in close proximity to the protected router or elsewhere as appropriate for the given implementation.

As introduced above, the boundary sensors may measure the strength, direction, and other characteristics of incoming wireless signals at their respective area of the boundary of the protected zone. The boundary transceivers may continually receive and measure these incoming wireless signals and directional changes, and may gather information about those incoming signals (e.g., frequency, wavelength, channel, signal strength, media access control (MAC) address, Internet Protocol (IP) address, service set identification (SSID), etc.). The boundary transceivers may be shielded to the rear of their respective sensing/generating directions to reduce filtering and other processing to omit consideration of wireless signaling generated from within the protected zone.

The boundary sensors may then send this information to the master zone protection transceiver for processing. The master transceiver accepts the information from the boundary transceivers, logs the information, and triangulates the precise direction from which any given signal is propagating into the protected zone.

It is understood that one or more incoming wireless signals may be interfering with communications within the protected zone, as described in more detail below. As such, the master zone protection transceiver may additionally and/or alternatively determine from the protected router that signal degradation has occurred with respect to a client device hosted by the protected router (e.g., dropped packets, excessive retries, etc.). The master zone protection transceiver may receive this information from the protected router along with a location of the affected client device for which the interference has been determined. The location of the affected client device may be identified using global positioning system (GPS) or other technology as appropriate for a given implementation.

The master zone protection transceiver may determine which of the potentially several incoming wireless signals is causing the interference based upon the location of the client device, and based upon the relative strengths and directions of the incoming wireless signals. The master zone protection transceiver may instruct one or more of the boundary transceivers to directionally mitigate the interference using directional out-of-phase signaling directed at the wireless signal source. As such, the wireless directional zone protection (boundary) transceivers may effectively cancel further incoming propagation of the interfering signal into the protected zone, and as described above and in more detail below, may effectively cancel further incoming signal propagation without destroying the utility of the interfering wireless signaling in other directions of propagation.

The identified one or more boundary transceivers may include a small directional antenna for detection of incoming interfering signal(s) and for generation of the directional mitigation signaling. The small directional antenna may be adjusted and focused in the direction of the offending signal. The boundary transceiver broadcasts the directional mitigation signal in the direction of the offending signal, using the same frequency, channel, and detected signal strength of the interfering signal, but inverted to cancel the continuously-changing amplitude of the interfering signal. A result of the out-of-phase/inverted interference mitigation signal is effective neutralization of the offending incoming signal, such that it no longer propagates into the protected zone and no longer causes the interference within the protected zone.

Through iterative communication with the master zone protection transceiver in communication with the protected router, the directional mitigation signaling may be refined to a minimal power level sufficient to mitigate the interference within the protected zone, and to avoid causing further disruption of the interfering wireless signal within its own usable wireless region. By use of a minimal power level sufficient to mitigate the interference, the generated directional mitigation signal is coincidently minimally invasive to the interfering signal and to the adjacent/neighboring wireless network(s).

It should be noted that the boundary transceivers may be installed on gutters, windows, or another part of a building, and may be installed either inside or outside as appropriate for the given implementation. The boundary transceivers may further be installed at any location along a side of a structure, or at corners of structures, again as appropriate for the given implementation.

The master zone protection transceiver may be installed in close proximity to the protected router, such that it may be physically wired to the protected router to ensure communications for purposes of interference mitigation. The functionalities of the master zone protection transceiver and the protected router may additionally be integrated into a single/combined device, as appropriate for the given implementation. Alternatively, the master zone protection transceiver may utilize a different wireless communication protocol, a different frequency, a different wireless channel, and other configurations as appropriate to ensure wireless communications with the protected router and the boundary sensors, and/or may be physically wired to these devices to ensure communications with the protected router and the boundary sensors, again as appropriate for a given implementation. The master zone protection transceiver may be positioned at any location that provides communication capabilities with the protected router and with the boundary sensors. As an additional alternative, the master zone protection transceiver, the protected router, and the boundary transceivers may utilize the same wireless protocol, frequency, and channel on which the interference is detected. In such a configuration, the respective devices may rely upon protocol-based transmission integrity (e.g., repeated transmission, etc.) or increased local signal strength to ensure that the respective devices may communicate in the protected area to effectively mitigate the interference.

The master zone protection transceiver may further format and output the received foreign signal information and the mitigation determinations (e.g., direction, power level, etc.) into a graphical user interface (GUI) that may be accessed via the local wireless or physical network (e.g., using a local network Internet Protocol (IP) address, such as <<192.168.1.2/boundary.html>>, with "http" and "://" as a prefix as appropriate to form an actual uniform resource locator (URL)). Information may be displayed regarding the direction of the incoming offending/interfering wireless signal, an identity of the boundary transceiver(s) closest to the offending/interfering wireless signal, and the mitigation measures that have been programmatically implemented by the master zone protection transceiver and the respective boundary transceiver(s) to reduce the interference within the protected zone.

Regarding interference mitigation and generation of the directional minimally-invasive power level interference cancellation signal (the directional mitigation signal again for brevity), it should be understood that signal propagation from a given wireless router may be configured to use a specific frequency, channel, and signal strength. The generated directional mitigation signal may mitigate (e.g., cancel) the interfering signal by being generated on the same channel, at the same frequency, and at the same "detected" power level as the detected interfering signal at the boundary transceiver, but generated one hundred and eighty degrees (180°) out of phase relative to (e.g., inverted relative to) the detected incoming interfering signal. As such, when the interfering signal is at its sinusoidal maximum, the generated minimally-invasive power level cancellation signal that is 180 degrees out of phase will be at its sinusoidal minimum, resulting in a net signal power level of zero (0) and effective cancellation of the offending/interfering signal. Similar analysis may be applied throughout a sinusoidal oscillation of the interfering signal, such that the generated directional mitigation signal may be applied to the interfering signal to result in a net signal power level of zero (0) throughout the periodicity of the interfering signal at the point of generation of the directional mitigation signal (e.g., at the respective boundary of the protected zone). The directional mitigation signal may be generated directionally to affect the interfering signal in a direction opposite to the source of propagation. In this way, the interfering signal may be effectively cancelled, and further propagation in the direction in which the signal was interfering may be avoided to mitigate the detected interference within the protected zone. Additionally, the directional effects of the minimally-invasive power level cancellation signal on the interfering signal diminish over distance as the directional mitigation signal propagates toward the source of the interfering signal and in the direction of increasing signal strength of the interfering signal, as described in more detail below.

To further the description of the directional mitigation signal, after initial generation of the directional mitigation signal, the respective boundary transceivers may check to see if the interfering signal is still present at the respective boundary sensor. If there is still an incoming interfering signal at a power level greater than zero (0), the boundary transceiver may increase the broadcast strength of the outgoing directional minimally-invasive power level interference cancellation signal. If there is no incoming interfering signal, the boundary transceiver may decrease the broadcast strength of the outgoing directional mitigation signal. In order to "neutralize" the interfering signal, the boundary transceiver(s) may continually check for incoming interfering signals and may adjust broadcast strength to match but not overpower the signal strength of the incoming interfering signal. As such, the boundary transceivers may iteratively and independently monitor their respective performance with respect to the interference mitigation activities relative to the protected zone.

Regarding signal strength and minimal intrusion of the directional mitigation signal into neighboring protected zones, it should be noted that signal decay at relative locations may be measured logarithmically, for example, such as by use of the decibel (dB) scale, or may be measured using percentages. Where percentages are used, a scale may be utilized, such as from minus one hundred twenty decibels (−120 dB) to zero decibels (0 dB), where zero (0) maps to one hundred percent (100%) and minus one hundred (−100) maps to zero percent (0%). Within such a scale, any signal under minus eighty decibels (−80 dB) may be considered unusable. Further, and using again decibels for purposes of example, a location at which a power level measurement of minus three decibels (−3 dB) relative to a signal source/origin power level is detected may be considered to approximate a half-power location of a signal along a given path of signal propagation. The minus three decibel (−3 dB) point may exist in all directions of propagation, and as such may be viewed as a contour or surface around the signal origin. This contour or surface may be at a constant radius in free air, or may traverse around the source at differing distances due to physical elements within the propagating signal path in the respective different directions.

For purposes of example and not limitation, it is to be understood that if a given incoming interfering signal was detected at its minus three decibel (−3 dB) point at a given boundary sensor, and the directional mitigation signal was generated at that equivalent detected power level from the location of that zone protection sensor to mitigate the interfering signal, then the minus three decibel (−3 dB) point of the generated directional outgoing interference mitigation signal would occur at a location between the sensor and the source location of full power generation of the interfering signal due to the fact that the generated directional mitigation signal is generated at half the power of the interfering signal (within this example). As a result, the generated directional mitigation signal would be less intrusive to the interfering network than the interfering signal is to the protected zone by the nature of the reduced power level at which the directional mitigation signal is generated relative to the generated power level of the interfering signal. Further with respect to the non-intrusive nature of the generated directional mitigation signal, the generated directional mitigation signal would be dominated by the full power generation of the interfering signal as it propagates in other directions from the source relative to the continually decreasing power level of the directional mitigation signal as that signal further propagates and reduces in signal strength.

Similar analysis may be applied to other detected power levels as described above, with similar relative interference mitigation applied with minimal interference to the originating wireless network. Accordingly, the directional mitigation signal may be considered "non-intrusive" for purposes of the present description, in that it is generated at a power level that is not intended to interfere with the neighboring wireless networks. The present subject matter may neutralize further propagation of only the offending incoming signals without significantly interfering with or overpowering neighboring wireless devices.

It should further be noted that multiple neighboring wireless networks may utilize the technology described herein to coordinate with one another and to each mitigate interference within their respective protected zones, and again with minimal interference to other protected zones. To further mitigate the intrusive effects of the generated directional mitigation signals, the technology described herein may further utilize neighboring master zone protection transceiver coordination in what is termed herein a "mutual interference mitigation feedback loop." The mutual interference mitigation feedback loop may be provided and established between neighboring master zone protection transceivers to allow the respective neighboring devices to each confirm with the other that the generated signal strength of their respective directional mitigation signals is not interfering with communications of client devices of the respective neighboring router(s) within the respective neighboring wireless networks. A mutual interference mitigation feedback loop may be established between each pair of neighboring master zone protection transceivers to create a multi-dimensional set of mutual non-interference feedback loops. As such, the neighboring master zone protection transceivers may communicate with each other to notify each other that one of their protected wireless router's connected client devices may be having degraded signal quality due to the signal interference mitigation activities performed by the respective other/neighboring protected zone. When this occurs, the affected master zone protection transceiver may send a request to the respective neighboring master zone protection transceiver to reduce the interference mitigation signaling performed by the respective neighboring protected zone. It should be understood that wireless routers may implement the master zone protection transceiver without departure from the scope of the subject matter described herein.

It is additionally understood that the location of client devices and movement of client devices served by the protected zone relative to the neighboring/interfering wireless networks may result in a dynamic and continually changing set of interference patterns. The technology described herein operates to continually adjust the mitigation activities over time as appropriate for a given detected signal interference. Where a mutual non-interference feedback loop is utilized to coordinate interference mitigation activities among different master zone protection transceivers, the location of client devices and movement of client devices relative to the respective serving (protected) routers and neighboring wireless networks may result in a dynamic and continually changing set of interference patterns. The technology described herein operates to continually adjust the mitigation activities among the collaborating protected zones, as appropriate for a given detected signal interference.

It should be noted that conception of the present subject matter resulted from recognition of certain limitations associated with use of multiple wireless routers in close proximity to one another, and the resulting wireless interference that is produced by overlapping wireless signaling. For example, it was observed that multiple wireless routers may be located within a single structure or in close proximity within adjacent structures, and that these "adjacent" wireless routers may use the same transmission protocol (e.g., IEEE 802.11b, etc.); and may even use the same frequency, channel, and signal strength for signaling in some cases. It was determined that the density of overlapping wireless signaling causes signal degradation in each adjacent wireless network due to interference, and that as a result wireless client devices may be unable to communicate via their designated wireless routers. It was additionally observed that the respective client devices that utilize the different mutually-interfering wireless routers are often physically separated within different structures or different portions of a structure when they access their respective wireless networks. As a result, these client devices are typically not attempting to utilize their respective wireless router from a location near where the interference caused by their respective networks is occurring within the adjacent wireless network.

It was additionally determined that, in view of the increasing density of wireless signaling sources, prior technologies that attempted to address signal interference were unsatisfactory for several reasons. Specifically, it was determined that prior signal jamming technologies (e.g., disabling communications) were unsatisfactory because this technology prevents any use of the originating signal, and may not comply with regulatory requirements in certain circumstances. Further, it was determined that prior radio frequency shielding technologies, where a building or room is adapted to have a physical barrier to block out unwanted signals (e.g., by use of paint, wallpaper, or wire mesh), were also unsatisfactory because this technology requires users to remain behind the physical barrier and does not allow wireless device users to move freely with their devices while connected to a wireless network.

Regarding the solution to these several problems described herein, it was further observed that because signals generally propagate in all directions from an omni-directional offending wireless router antenna (or directionally from a parabolic or other directional offending wireless antenna), and because signals naturally decrease in transmitted power as distance increases, new technology to mitigate wireless interference as it propagates from a particular source in a particular direction using a generated directional minimally-invasive power level interference cancellation signal would be less likely to interfere with the offending signal as it propagates in other directions. It was further determined that because client devices may be moved, with a resulting change in the location of the wireless interference, the power level and directional characteristics of the generated directional minimally-invasive power level interference cancellation signal should be dynamically adjusted over time to dynamically refine and maintain the lowest possible power level to effectively mitigate interference at the particular and often changing location of interference. The present technology operates in a dynamic manner to continually adjust directional mitigation of interfering signals. The new technology described herein selectively, directionally, and dynamically mitigates specific unwanted foreign wireless signals to reduce interference with client devices connected to a given router, and to improve access to and use of the given router by the respective client devices. As further described herein, this new technology may perform the interference mitigation without rendering the interfering wireless router inoperative for its intended purposes in other directions, so that the interfering wireless router may serve its respective client devices. The present subject matter improves wireless technology by providing for selective directional mitigation of wireless signal interference, as described above and in more detail below. As such, improved inter-device communication and improved neighboring wireless network autonomy may be obtained through use of the present technology.

The selective directional mitigation of wireless signal interference described herein may be performed in real time to allow prompt and dynamic signal compensation to mitigate interfering wireless signals. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for selective directional mitigation of wireless signal interference. A wireless computing device 102 communicates via a protected wireless network 104 and a protected router 106 with several other devices, represented generally by a server 108 that may be accessed by a network 110. The protected wireless network 104 and the protected router 106 may be part of a single physical device without departure from the scope of the present technology, and as such these components are alternatively represented as a protected wireless router 112.

A master zone protection transceiver 114 interoperates with the protected router 106 and with several boundary transceivers/sensors that, for purposes of example, include a boundary transceiver 116, a boundary transceiver 118, a boundary transceiver 120, and a boundary transceiver 122. While the four (4) boundary transceivers 116-122 are illustrated, any number of boundary transceivers may be utilized as appropriate for a given implementation.

A mitigation network 124 provides separate connectivity between the master zone protection transceiver 114, the protected router 106, and the boundary transceivers 116-122. The mitigation network 124 does not rely upon the protected wireless network 104 to allow the respective devices to communicate during times of wireless interference that is imposed upon the protected wireless network 104 by other wireless networks (not shown). As such, the mitigation network 124 allows communication and coordination of mitigation activities to counteract the detected wireless interference. Further, it is recognized that the mitigation activities implemented by the master zone protection transceiver 114 and one or more of the boundary transceivers 116-122 may, over time, finely tune a particular mitigation signal strength that adequately mitigates the wireless interference without excessive corruption of the interfering/ neighboring wireless network, and use of the separate mitigation network 124 may provide uninterrupted communications during mitigation activities and during other times. The mitigation network 124 may further allow the respective devices to communicate and mitigate interfering wireless signaling even where wireless interference otherwise prohibits wireless communication between the respective devices over the protected wireless network 104. It is understood that the devices may selectively transition from communications over the protected wireless network 104 to the mitigation network 124 in response to detection of signal interference or degradation of the protected wireless network 104.

The mitigation network 124 is illustrated as a solid line to represent a hard-wired connection. However, the mitigation network 124 may alternatively be implemented using one or more different wireless channels and/or protocols that are distinct from those used by the protected wireless network 104, as appropriate for a given implementation.

As introduced above, the master zone protection transceiver 114 operates to control directional orientation and signaling operations of the respective boundary transceivers 116-122. As such, the master zone protection transceiver 114 may control the respective boundary transceivers 116-122 to pan, tilt, or otherwise move and to allow the respective boundary transceivers 116-122 to detect wireless signaling that originates from neighboring wireless networks and to generate directional countermeasures to mitigate detected wireless interference. The master zone protection transceiver 114 may determine appropriate corrective/mitigating signaling and may control one or more of the respective boundary transceivers 116-122 to mitigate wireless signal interference.

Further, as also introduced above, the master zone protection transceiver 114 may inter-operate with other master zone protection transceivers in other systems (each not shown) that are similar to the system 100 to implement a mutual non-interference feedback loop to coordinate interference mitigation activities among the respective neighboring systems. In such an implementation, the mitigation network 124 may further provide communications with the neighboring system(s) for implementation of the mutual non-interference feedback loop between master zone protection transceivers, such as the master zone protection transceiver 114, located within the respective neighboring system(s).

As will be described in more detail below in association with FIG. 2 through FIG. 5B, the master zone protection transceiver 114 in coordination with the respective boundary transceivers 116-122 provide automated selective directional mitigation of wireless signal interference. The automated selective directional mitigation of wireless signal interference is based upon detection and mitigation of wireless signal interference caused by neighboring wireless networks. While the respective devices are shown as distinct components, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 110 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 108 may include any device capable of providing data for consumption by a device, such as the wireless computing device 102, via a network, such as the network 110. As such, the server 108 may include a web server, application server, or other data server device.

Figure 2:
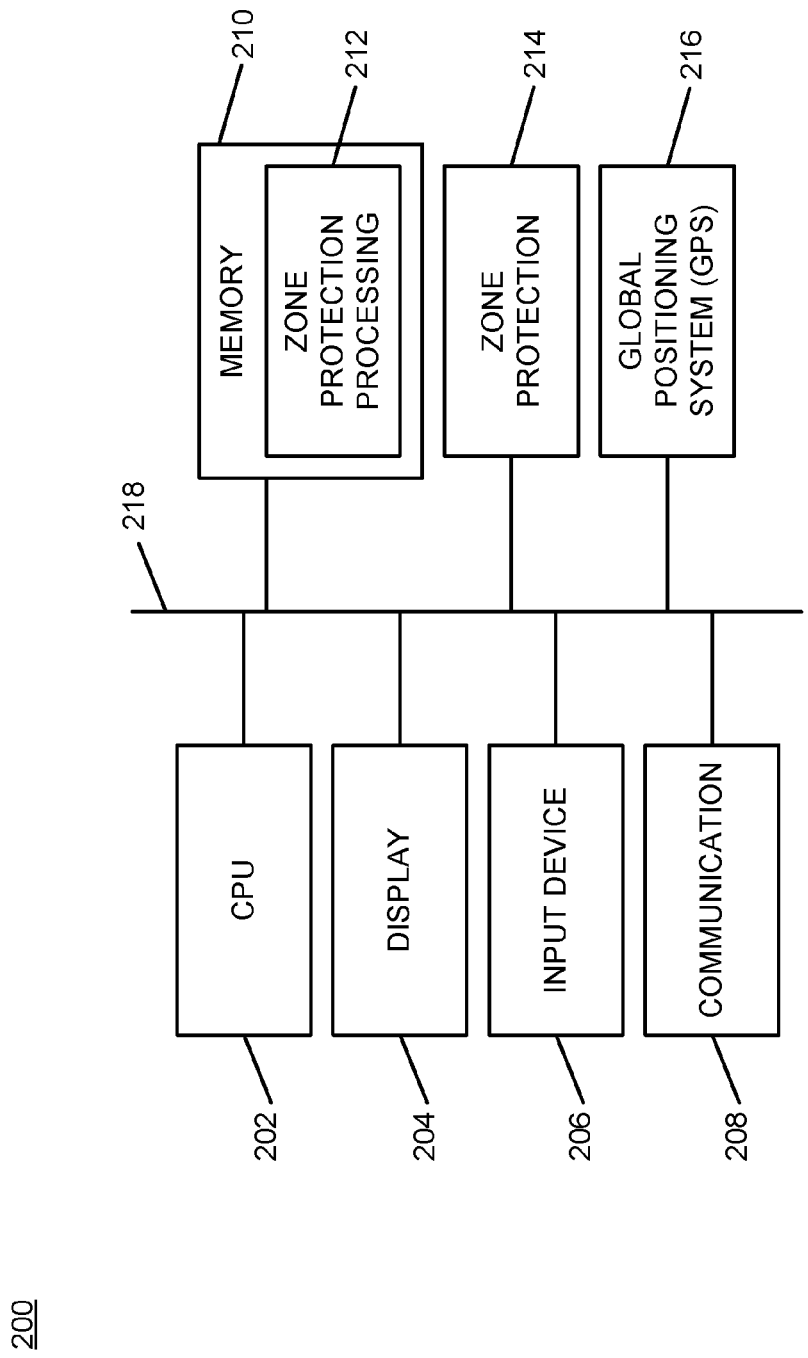
FIG. 2 is a block diagram of an example of an implementation of a core processing module capable of performing selective directional mitigation of wireless signal interference according to an embodiment of the present subject matter.

FIG. 2 is a block diagram of an example of an implementation of a core processing module 200 capable of performing selective directional mitigation of wireless signal interference. The core processing module 200 may be associated with the master zone protection transceiver 114 and the boundary transceivers 116-122. Further, certain portions of the core processing module 200 may be associated with either the wireless computing device 102, with the server 108, and with other components of the system 100 of FIG. 1, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of selective directional mitigation of wireless signal interference in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, a touchscreen, a voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may include wireless signal capabilities useable to detect and generate wireless signaling, including detection of interfering wireless signaling and generation of wireless mitigation signaling by the respective boundary transceivers 116-122.

A memory 210 includes a zone protection processing and storage area 212 that stores wireless signal interference detection and mitigation information in association with the core processing module 200. As will be described in more detail below, wireless signal interference detection and mitigation information stored within the zone protection processing and storage area 212 is used to detect and mitigate wireless interference from neighboring wireless networks.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A zone protection module 214 is also illustrated. The zone protection module 214 provides wireless interference detection and mitigation capabilities for the core processing module 200, as described above and in more detail below. The zone protection module 214 implements the automated selective directional mitigation of wireless signal interference of the core processing module 200. Where the core processing module 200 is installed in association with a boundary transceiver, the zone protection module 214 may additionally include an altimeter for detection of an elevation of installation for a boundary transceiver usable to determine a three-dimensional (3D) cancellation bearing identified by the respective boundary transceiver, and may include a mechanical control unit that includes one or more controls for movement and panning of the respective boundary transceiver (e.g., one or more servo motors, etc.). Other variations and implementations of the zone protection module 214 are possible in accordance with a given installation, and all such variations and implementations are considered within the scope of the present description.

It should also be noted that the zone protection module 214 may form a portion of other circuitry described without departure from the scope of the present subject matter. The zone protection module 214 may form a portion of an interrupt service routine (ISR), a portion of an operating system, or a portion of an application without departure from the scope of the present subject matter. The zone protection module 214 may also include an embedded device with circuitry designed specifically to perform the processing described herein, as appropriate for a given implementation.

It should further be noted that the zone protection module 214 may implement complementary functionality according to the respective device with which it is associated. For example, where the zone protection module 214 is associated with the master zone protection transceiver 114, the zone protection module 214 may provide coordination activities with the protected router 106 and the wireless computing device 102 to detect conditions of wireless interference, and to instruct the respective boundary transceivers 116-122 to implement a designated wireless mitigation strategy, including appropriate mitigation feedback within the system 100 regarding corrective measures implemented by the boundary transceivers 116-122 and the effectiveness of mitigation activities at improving communications between the wireless computing device 102 and the protected router 106. Alternatively, where the zone protection module 214 is implemented in association with a boundary transceiver, the zone protection module 214 may provide directional control of the respective boundary transceiver to provide wireless interference analysis and directional detection capabilities, and to provide wireless mitigation signal generation and power control capabilities.

A global positioning system (GPS) module 216 provides positioning coordinates usable for identifying locations of devices. The GPS module 216 may also be used to identify a relative spatial relationship between devices for which wireless interference is detected and proximate interfering wireless source devices.

The CPU 202, the display 204, the input device 206, the communication module 208, the memory 210, the zone protection module 214, and the GPS module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3A:
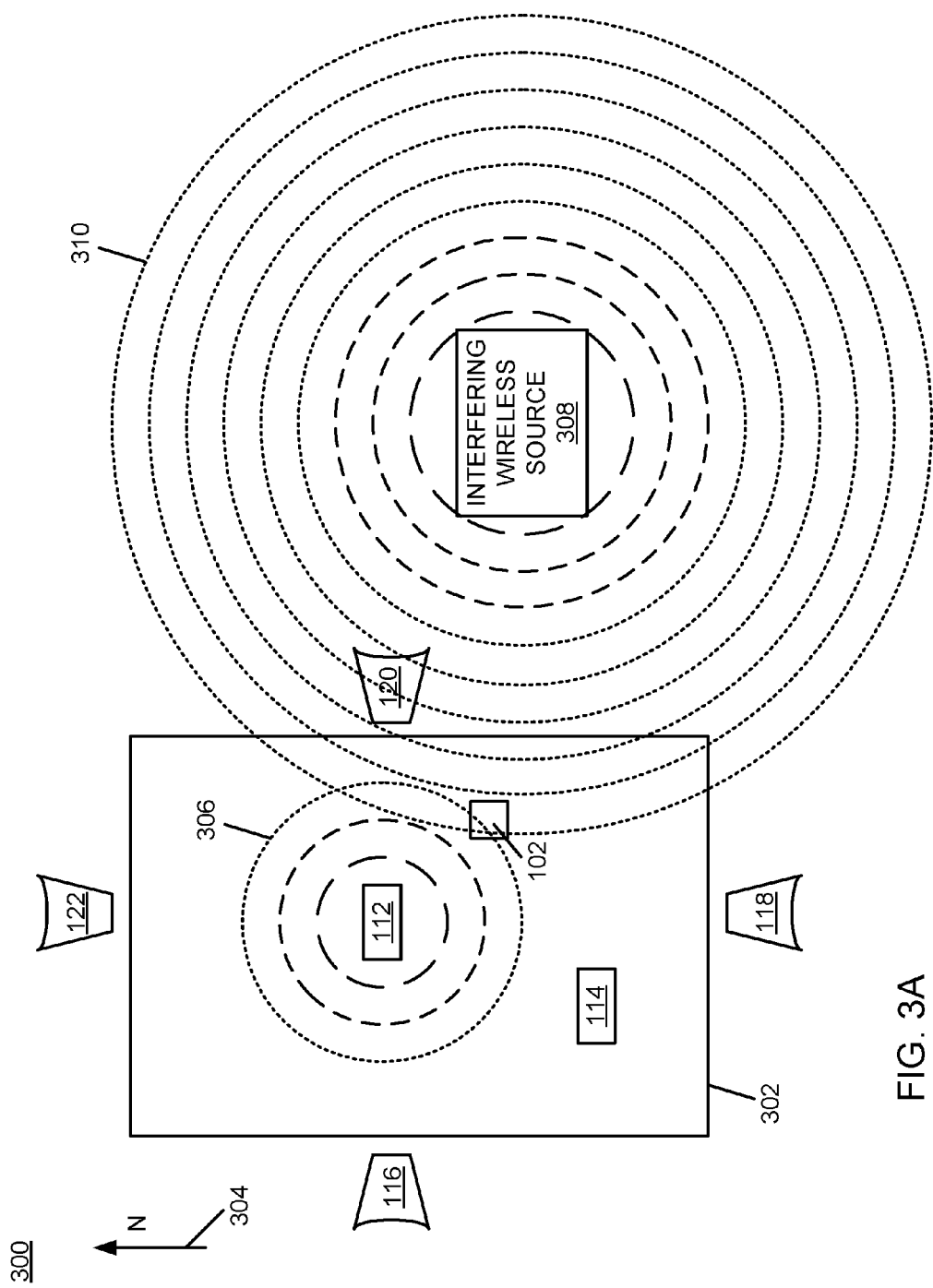
FIG. 3A is a block diagram of an example of an implementation of an overhead view of a deployment of the system of FIG. 1 at an initial time of detection of wireless interference within a protected zone according to an embodiment of the present subject matter.
Figure 3B:
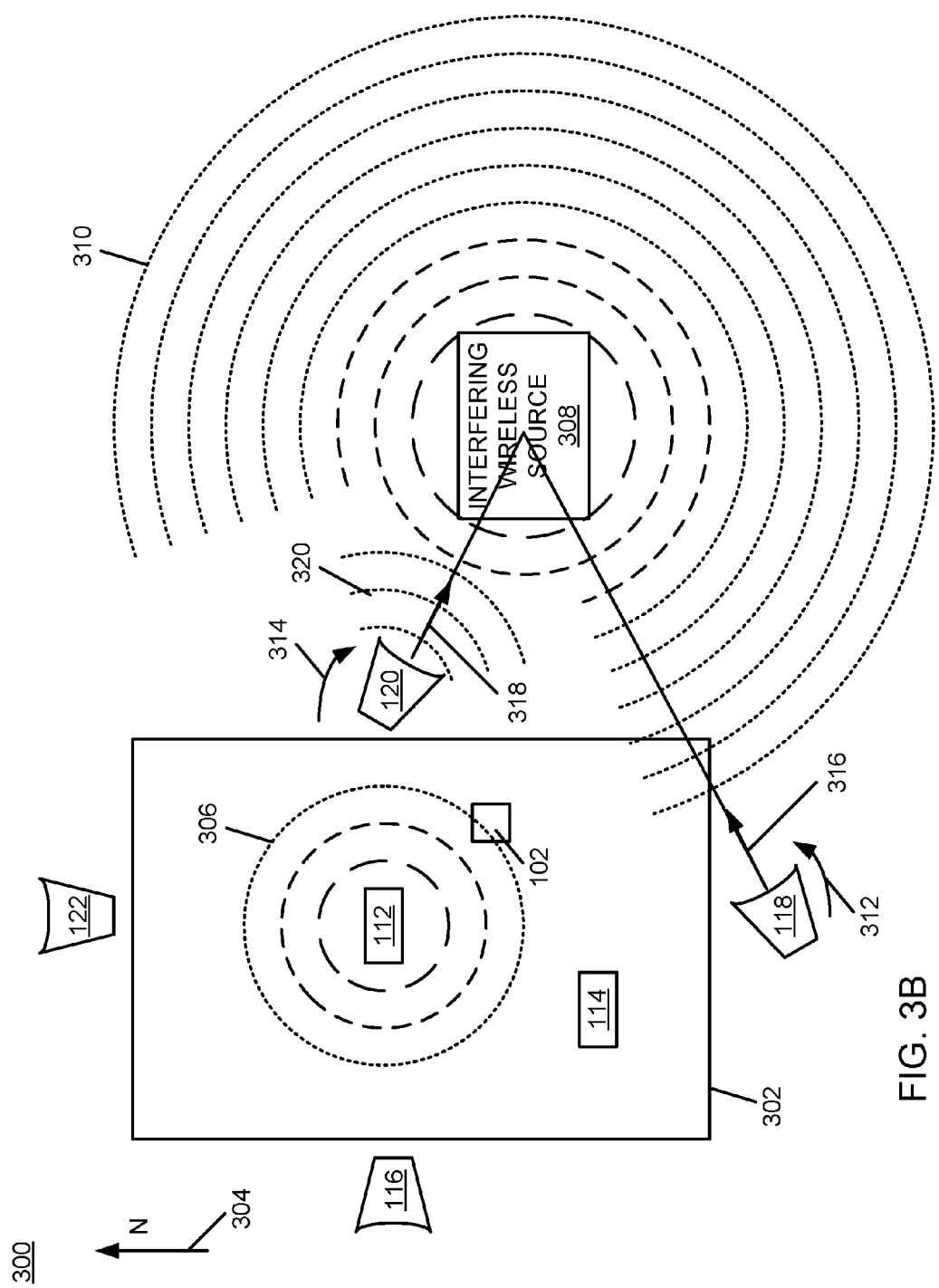
FIG. 3B is a block diagram of an example of an implementation of the overhead view of FIG. 3A at a later time of mitigation of the detected wireless interference for selective directional mitigation of wireless signal interference according to an embodiment of the present subject matter.

FIG. 3A and FIG. 3B described below collectively represent an example of a time sequence in accordance with selective directional mitigation of wireless signal interference. FIG. 3A is a block diagram of an example of an implementation of an overhead view 300 of a deployment of the system 100 of FIG. 1 at an initial time of detection of wireless interference within a protected zone. Certain of the components of the system 100 of FIG. 1 are not depicted within the overhead view 300 to avoid crowding within the drawing.

As described above, a protected zone is defined as a given "protected" router's effective operational zone, and as such defines a three-dimensional (3D) geographic region within which interference from other wireless networks may be detected and mitigated as described herein. The wireless computing device 102, the protected wireless router 112, and the master zone protection transceiver 114 are each shown generally located within a structure 302. The structure 302 may be a building, a room or space within a building, an open air patio, a lawn or area of a park, or other form of protected zone as appropriate for a given implementation. The structure 302 represents a protected zone for purposes of the present example, with the understanding that other areas outside of the structure 302 may utilize the protected wireless router 112, and these additional areas may be included in the protected zone. As such, in actuality, the protected zone of the protected wireless router 112 may extend beyond physical boundaries of the structure 302, though for purposes of the present example locations within the structure 302 are sufficient to describe the technology presented herein.

As introduced above, wireless signaling emanating from the protected wireless router 112 may be spherical, conical, or otherwise generated by the protected wireless network 104 as appropriate for a given implementation. As such, a shape of a given protected zone may alternatively be defined as a 3D surface of constant effective signal strength of the wireless signaling generated by the protected wireless network 104. A defined signal-strength boundary of a protected zone may be defined as a signal strength surface relative to the original signal strength of the wireless signaling of the protected wireless network 104 (e.g., a 3 dB or other relative power decrease that still provides suitable operational signal strength for use by the wireless computing device 102). Further, where signal strength is utilized to define the protected zone, it should be understood that, while represented as a continuous surface, a diameter of that continuous surface may differ along the circumference due to different densities of materials along various paths of signal propagation. As such, a protected zone may be defined as a region of any appropriate dimension within which a wireless computing device (e.g., the wireless computing device 102) served by a wireless network (e.g., the protected wireless network 104) may otherwise communicate by use of the wireless network absent interference from other neighboring wireless networks. Accordingly, a protected zone represents a region of normal functional operation of the protected wireless network 104, and may include a second or subsequent floor/story of the structure 302 without departure from the scope of the present subject matter, and the wireless computing device 102 may be located on a different floor within the structure 302.

The boundary transceivers 116-122 are illustrated as positioned along a boundary of the structure 302. As noted above the boundary transceivers 116-122 may be installed on gutters, windows, or another part of a building, and may be installed either inside or outside as appropriate for the given implementation. As depicted within the present example, the boundary transceivers 116-122 may each physically self-control three-dimensional (3D) panning by use of one or more servo motors or other technology to achieve an approximate one hundred and eighty (180) degrees of motion horizontally and vertically to scan for incoming interfering wireless signaling. The boundary transceivers 116-122 may alternatively be mounted on corners of the structure 302 and may each physically pan again by use of one or more servo motors or other technology to achieve an approximate two hundred and seventy (270) degrees of motion horizontally and vertically (3D) to scan for incoming interfering wireless signaling, as appropriate for a given implementation.

Within the present example, a North arrow 304 depicts a northerly orientation within the overhead view 300. As can be seen, the boundary transceiver 116 is illustrated as being located on a West side of the structure 302, the boundary transceiver 118 is illustrated as being located on a South side of the structure 302, the boundary transceiver 120 is illustrated as being located on an East side of the structure 302, and the boundary transceiver 122 is illustrated as being located on a North side of the structure 302.

Wireless signaling 306 is depicted as emanating from the protected wireless router 112 within the structure 302. The wireless signaling 306 is graphically represented to be generated at a signal level sufficient for use under ordinary circumstances by the wireless computing device 102 without excessive propagation outside of the structure 302. Not all radiating signaling is depicted for the wireless signaling 306 to reduce crowding within the drawing.

The master zone protection transceiver 114 instructs the four (4) boundary transceivers 116-122 to begin panning (not illustrated) a three-dimensional area that surrounds the structure 302 and to perform wireless signal detection to determine whether a neighboring wireless signal is detectable at a boundary of the structure 302 at a signal strength sufficient to interfere with wireless communications within the structure 302.

An interfering wireless source 308 is depicted to be generating an interfering wireless signaling pattern 310. For purposes of example, the interfering wireless signaling pattern 310 is generated at a signal strength sufficient to penetrate the structure 302 and to also interfere with communications between the wireless computing device 102 and the protected wireless router 112, as represented by the dotted boundary lines of the interfering wireless signaling pattern 310 that overlap the wireless computing device 102.

The boundary transceivers 116-122 pan in a 3D motion within their respective designated areas to detect wireless interference that enters the protected zone represented by the structure 302. As also described above, a rear area of the boundary transceivers 116-122 may be shielded to avoid reception of the wireless signaling 306 by the respective boundary transceivers.

Figure 4:
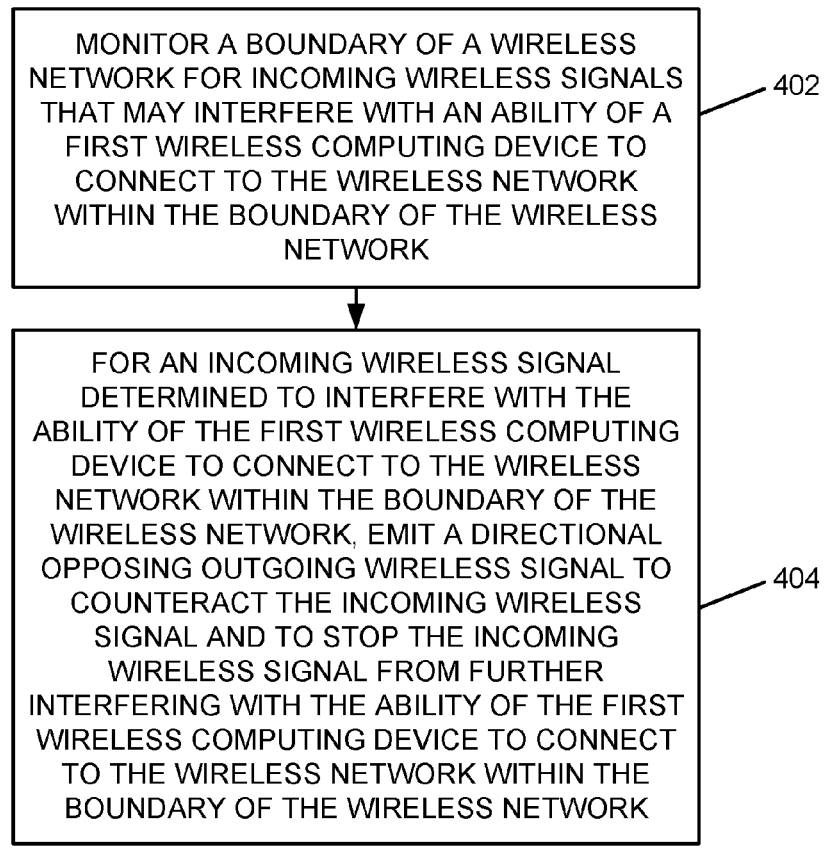
FIG. 4 is a flow chart of an example of an implementation of a process for selective directional mitigation of wireless signal interference according to an embodiment of the present subject matter.

Within the present example, based upon the shielding and movement capabilities of the respective boundary transceivers 116-122, each of the boundary transceiver 118 and the boundary transceiver 120 detect the interfering wireless signaling pattern 310, and each respectively lock into a respective detected position/direction of greatest three-dimensional (3D) detected signal strength of the interfering wireless signaling pattern 310 to determine the 3D source direction of the interfering wireless signaling pattern 310 (as described in more detail in association with FIG. 4 below). The locked position of the greatest 3D detected signal strength of the interfering wireless signaling pattern 310 may be considered a "cancellation bearing" for purposes of the present description, because the cancellation bearing is a direction of generation of a directional out-of-phase/inverted interference mitigation signal. The boundary transceivers 116 and 122 are presumed not to detect the interfering wireless signaling pattern 310 within the present example. Additionally, for purposes of the present example, it is noted the interfering wireless signaling pattern 310 is weaker at a location of the boundary transceiver 118, and it is additionally noted that signal propagation of the interfering wireless signaling pattern 310 past a location of the boundary transceiver 118 would not affect wireless communications within the structure 302.

Each of the boundary transceiver 118 and the boundary transceiver 120 further determine the detected signal strength of the interfering wireless signaling pattern 310 at the specific location of the respective boundary transceiver 118 and 120. As described above, the directional out-of-phase/inverted interference mitigation signal may be generated at the detected power level of the interfering wireless signaling pattern 310 at the location of the respective boundary transceiver 118 and 120 along a respective cancellation bearing to match the detected power level of the interfering wireless signaling pattern 310. As such, the generated interference mitigation signal may effectively mitigate further propagation of the interfering wireless signaling pattern 310 past the respective boundary transceiver 118 and 120, while minimally impacting other communications with the interfering wireless source 308. Accordingly, the present technology may operate to mitigate interference from neighboring wireless networks without rendering those neighboring wireless networks inoperative.

It should also be noted that the interfering wireless signaling pattern 310 may be originating from a ground level outside of the structure 302, or may be generated from a neighboring structure (not shown) on a second or higher elevation/floor of the neighboring structure. As such, the 3D source direction provides improved accuracy for wireless signal mitigation activities, as described in more detail below.

FIG. 3B is a block diagram of the example of the implementation of the overhead view 300 of FIG. 3A at a later time of mitigation of the detected wireless interference for selective directional mitigation of wireless signal interference. FIG. 3B represents a later time during which the detected wireless interference described above in association with FIG. 3A is mitigated by the master zone protection transceiver 114 and the respective boundary transceivers. Again, certain of the components of the system 100 of FIG. 1 are not depicted within the overhead view 300 to avoid crowding within the drawing.

Within FIG. 3B, it can be seen that the boundary transceiver 118 and the boundary transceiver 120 have each turned (as represented by the respective arrows 312 and 314), and have locked into a position of greatest three-dimensional (3D) detected signal strength of the interfering wireless signaling pattern 310. A 3D cancellation bearing 316 represented with an arrow and line depicts the greatest 3D detected signal strength relative to the boundary transceiver 118. Similarly, a 3D cancellation bearing 318 represented with an arrow and line depicts the greatest 3D detected signal strength relative to the boundary transceiver 120. As such, the boundary transceiver 118 and the boundary transceiver 120 have each determined the 3D source direction of and a respective appropriate cancellation bearing for the interfering wireless signaling pattern 310.

The boundary transceivers 118 and 120 communicate their respective detected interfering wireless signaling pattern 310 information (e.g., cancellation bearing, detected power level, etc.) to the master zone protection transceiver 114. The master zone protection transceiver 114 performs a triangulation among known 3D locations of the two boundary transceivers 118 and 120 and the respective 3D cancellation bearings 316 and 318, and identifies a location of origin of the interfering wireless source 308. It is understood that GPS information or other technology may be utilized to identify the respective locations.

For purposes of the present example, it is presumed that the master zone protection transceiver 114 determines that the direction and signal strength of the interfering wireless signaling pattern 310 detected by the boundary transceiver 118 are determined to be minimal and directionally unrelated to the location of the wireless computing device 102. As such, the present example illustrates that the boundary transceiver 118 is not instructed by the master zone protection transceiver 114 to initiate signal mitigation activities in an area between the boundary transceiver 118 and the interfering wireless source 308. Accordingly, the interfering wireless signaling pattern 310 is not impeded by the boundary transceiver 118 as it further propagates in a direction that does not cause the specific interference being experienced by the wireless computing device 102.

In contrast, the direction and signal strength of the interfering wireless signaling pattern 310 detected by the boundary transceiver 120 are determined by the master zone protection transceiver 114 to be causing the specific interference being experienced by the wireless computing device 102, and directionally specific to the location of the wireless computing device 102. As such, the present example illustrates that the boundary transceiver 120 generates a directional out-of-phase/inverted interference mitigation signal 320 directed along a determined 3D cancellation bearing 318 toward the interfering wireless source 308 in an area between the boundary transceiver 120 and the interfering wireless source 308.

As described above, the initiated directional out-of-phase/inverted interference mitigation signal 320 generated by the boundary transceiver 120 is generated at an equivalent signal power level as the previous detected power level of the interfering wireless signaling pattern 310 at a location of the boundary transceiver 120. As such, the generated directional out-of-phase/inverted interference mitigation signal is generated at a minimally invasive power level relative a power level of the interfering wireless source 308, yet counteracts the interference to the wireless signaling 306 generated by the protected wireless router 112 in the specific location of use by the wireless computing device 102. Accordingly, the interfering wireless signaling pattern 310 may be mitigated in a direction that is determined to cause the specific interference being experienced by the wireless computing device 102.

As such, the example of FIGS. 3A and 3B show an implementation of selective directional mitigation of wireless signal interference. Other examples are possible and all such examples are considered within the scope of the present technology.

Figure 5A:
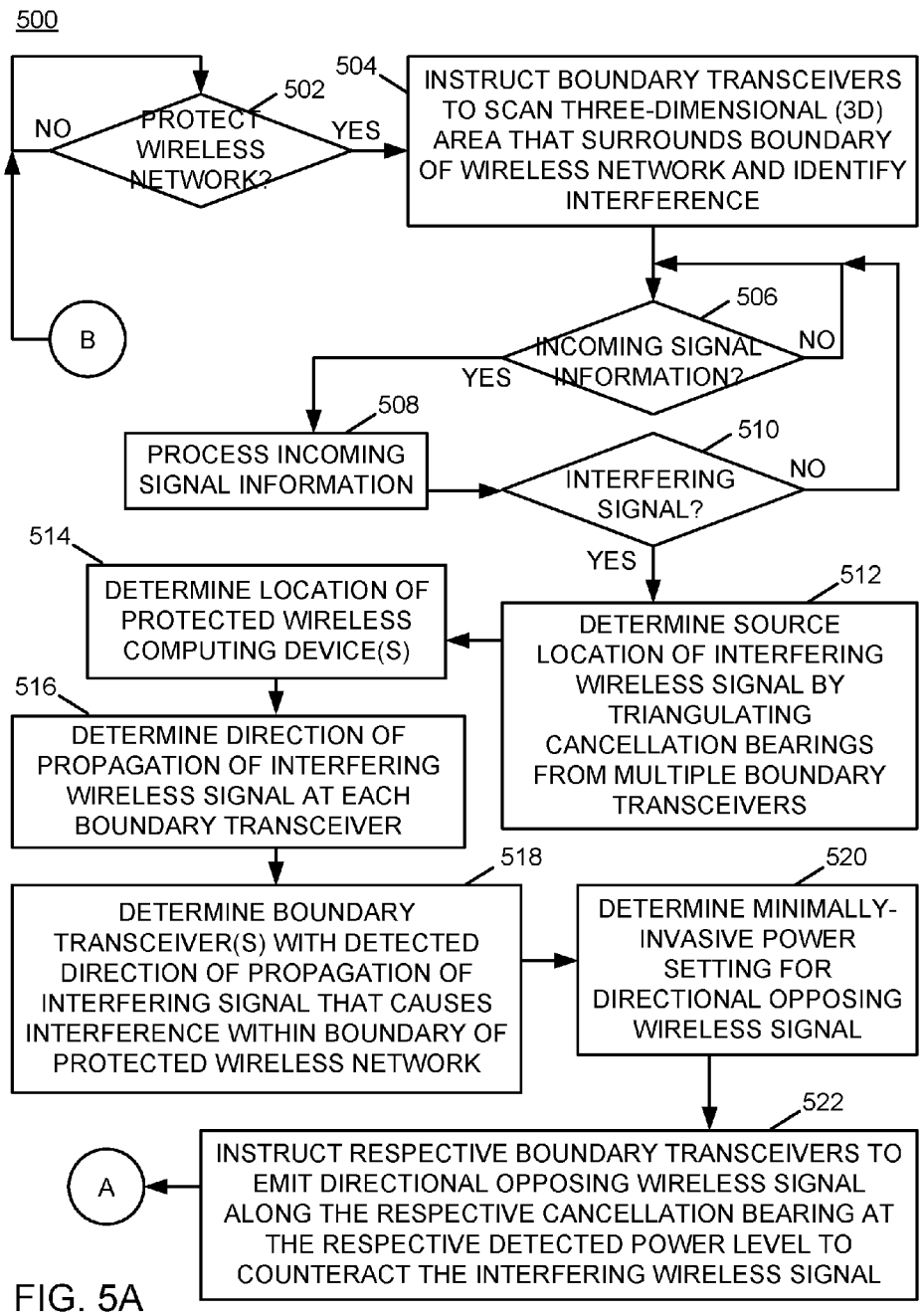
FIG. 5A is a flow chart of an example of an implementation of initial processing of a process for selective directional mitigation of wireless signal interference that further details control of a set of boundary transceivers and collaborative mitigation processing among protected wireless networks using an interference mitigation feedback loop according to an embodiment of the present subject matter.
Figure 5B:
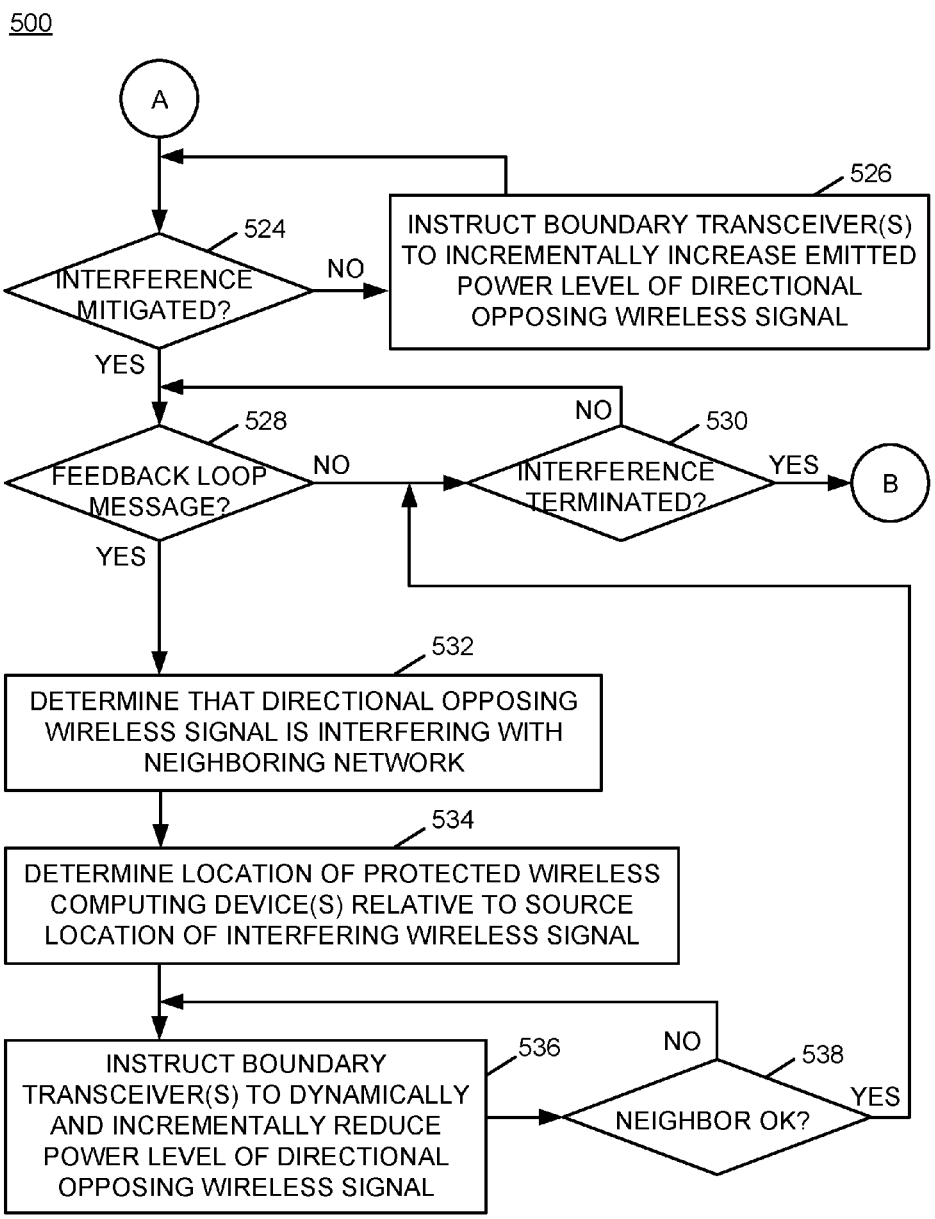
FIG. 5B is a flow chart of an example of an implementation of additional processing associated with the process for selective directional mitigation of wireless signal interference that further details control of a set of boundary transceivers and collaborative mitigation processing among protected wireless networks using an interference mitigation feedback loop according to an embodiment of the present subject matter.

FIG. 4 through FIG. 5B described below represent example processes that may be executed by devices, such as the core processing module 200, to perform the automated selective directional mitigation of wireless signal interference associated with the present subject matter. Many other variations on the example processes are possible and all are considered within the scope of the present subject matter. The example processes may be performed by modules, such as the zone protection module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for selective directional mitigation of wireless signal interference. The process 400 represents a computer-implemented method of performing the subject matter described herein. At block 402, the process 400 monitors a boundary of a wireless network for incoming wireless signals that may interfere with an ability of a first wireless computing device to connect to the wireless network within the boundary of the wireless network. At block 404, the process 400, for an incoming wireless signal determined to interfere with the ability of the first wireless computing device to connect to the wireless network within the boundary of the wireless network, emits a directional opposing outgoing wireless signal to counteract the incoming wireless signal and to stop the incoming wireless signal from further interfering with the ability of the first wireless computing device to connect to the wireless network within the boundary of the wireless network.

FIGS. 5A-5B illustrate a flow chart of an example of an implementation of process 500 for selective directional mitigation of wireless signal interference that further details control of a set of boundary transceivers and collaborative mitigation processing among protected wireless networks using an interference mitigation feedback loop. The process 500 represents a computer-implemented method of performing the subject matter described herein. FIG. 5A illustrates initial processing within the process 500. The process 500 may be implemented in association with a master zone protection transceiver of a wireless zone protection system, such as the master zone protection transceiver 114 of the system 100 as described above.

At decision point 502, the process 500 makes a determination as to whether to begin protection of a wireless network to implement a protected wireless zone. For example, the process 500 may be initiated in association with a boot procedure, interval processing, or other event associated with a master zone protection transceiver of a protected wireless system as appropriate for a given implementation. In response to determining to begin protection of a wireless network to implement a protected wireless zone at decision point 502, at block 504 the process 500 instructs boundary transceivers (wireless directional zone protection boundary transceivers), such as the boundary transceivers 116-122, to scan a three-dimensional (3D) area/region that surrounds a boundary of the wireless network to be protected and to identify incoming wireless signals (interference) that may interfere with the ability of a first/local (protected) wireless computing device to connect to the wireless network within the boundary of the wireless network. It should be noted that other variations on the processing described are possible, and all such variations are considered within the scope of the present technology. For example, as an alternative to instructing the boundary transceivers to scan to identify incoming signals, the protected router 106 may determine that the wireless computing device 102 has a degraded signal (e.g., worse than normal connectivity or worse than a baseline) and may report that proactively to the boundary transceivers 116 through 122. Further, the protected router 106 may alternatively report the degraded signal to the master zone protection transceiver 114, which may then determine and coordinate with the boundary transceivers 116 through 122 regarding which of the boundary transceivers are to send out cancellation signals. These types of alternative forms of processing are understood to form a part of the description herein, and any reference to functionality of the boundary transceivers to initiate control/communication may alternatively be implemented at the respective other device(s) (e.g., the protected router 106, the master zone protection transceiver 114, etc.) to process and control the boundary transceivers 116 through 122.

At decision point 506, the process 500 begins a re-entrant procedural processing loop that processes messages from the boundary transceivers. Specifically, at decision point 506 the process 500 makes a determination as to whether incoming signal information has been received from any of the boundary transceivers. As described above, received incoming signal information may include a detected power level of an incoming wireless signal at a respective location of a given boundary transceiver and a three-dimensional (3D) cancellation bearing relative to the respective boundary transceiver that specifies a source direction of the incoming wireless signal relative to the respective boundary transceiver.

At block 508, the process 500 processes the received incoming signal information to evaluate the direction and magnitude of the detected incoming wireless signal(s) relative to locations of wireless computing devices within the protected wireless zone. It is understood that incoming signal information may be received from multiple boundary transceivers in association with contemporaneous detection of incoming wireless signals at the respective installation locations of the respective boundary transceivers.

At decision point 510, the process 500 makes a determination, based upon the incoming signal information received from at least one of the boundary transceivers, as to whether an incoming wireless signal is interfering with communications within the protected wireless zone. The process 500 may determine that the incoming wireless signal is interfering with an ability of at least one of the protected wireless computing devices to connect to the wireless network within the boundary of the protected wireless network along a direction of propagation of the incoming wireless signal as detected by the respective boundary transceivers. In response to determining that the incoming wireless signal is not interfering with communications within the protected wireless zone, the process 500 returns to decision point 506 and iterates as described above to continue processing incoming wireless signal information received from the boundary transceivers.

In response to determining at decision point 510 that the incoming wireless signal is interfering with communications within the protected wireless zone, the process 500 begins processing to mitigate the interfering wireless signal. At block 512, the process 500 determines a source location of the interfering wireless signal by triangulating cancellation bearings received from multiple boundary transceivers. At block 514, the process 500 determines a location of any local/protected wireless computing device(s) within the protected zone. It should be noted that the process 500 may routinely make the determination of the location of any protected wireless computing device(s) within the protected zone as these devices may be moved within the protected wireless zone over time. As such, the placement of the determination at block 514 within FIG. 5A and the process 500 is for convenience of description and is not considered limiting.

At block 516, the process 500 determines a direction of propagation of the interfering wireless signal at each boundary transceiver that has reported detection of the interfering wireless signal. At block 518, the process 500 determines which of the boundary transceivers has detected the inferring wireless signal for which the respective detected direction of propagation of the interfering wireless signal is determined to interfere with the ability of a protected wireless computing device to connect to the wireless network within the boundary of the protected wireless network.

At block 520, the process 500 determines a minimally-invasive power setting at which to generate a directional opposing wireless signal that mitigates the interference within the wireless zone (e.g., a protected wireless network) caused by the interfering wireless signal without rendering the interfering wireless signal entirely inoperative outside of the wireless zone. As such, the process 500 determines a minimally-invasive power level at which to emit the directional opposing outgoing wireless signal such that an amount of counteraction of the incoming wireless signal outside the boundary of the wireless network is minimized. As described above, the determined minimally-invasive power level may be a power level equivalent to a detected power level of the interfering incoming wireless signal at the boundary of the wireless network that is being protected. It is noted that, when generated, the directional opposing second wireless signal may decay in power level as it propagates towards an increasing power level of the interfering wireless signal in the direction of the source location from which the interfering wireless signal is generated. This may minimize the amount of counteraction of the first wireless signal outside the boundary of the wireless network that is being protected.

At block 522, the process 500 instructs the respective boundary transceiver to emit the directional opposing second wireless signal along the respective cancellation bearing at a respective detected power level of the first wireless signal to counteract the first wireless signal. Emitting the directional opposing second wireless signal to counteract the first wireless signal may include emitting an inverted directional signal (e.g., an inverted interference mitigation signal) that is out of phase relative to a phase of the incoming wireless signal and that is generated at the determined minimally-invasive power level and directed toward a source location from which the first wireless signal is generated.

It should be noted that as an alternative, the process 500 may instruct the respective boundary transceiver(s) to begin emitting the directional opposing second wireless signal along the respective cancellation bearing at a default initial level during a time that the process 500 determines the minimally-invasive power setting, and the process 500 may instruct the respective boundary transceivers to dynamically adjust the emitted power level over time to tune the power output and mitigation of the directional opposing second wireless signal.

The process 500 transitions to the processing shown and described in association with FIG. 5B. The transition location is represented by the circled letter "A" within each drawing.

FIG. 5B illustrates additional processing associated with the process 500 for selective directional mitigation of wireless signal interference that further details control of a set of boundary transceivers and collaborative mitigation processing among protected wireless networks using an interference mitigation feedback loop. At decision point 524, the process 500 makes a determination as to whether the detected interference was successfully mitigated by the emitted directional opposing second wireless signal(s). In response to determining that the detected interference was not successfully mitigated by the emitted directional opposing second wireless signal(s), the process 500 instructs the respective boundary transceiver(s) to incrementally increase the emitted power level of the directional opposing wireless signal at block 526. As such, the process 500 may dynamically increase/adjust a power level of the emitted directional opposing wireless signal based upon the effectiveness of the previously implemented mitigation activities. The process 500 may alternatively dynamically decrease/adjust the power level of the emitted directional opposing wireless signal until the boundary transceiver(s) again detect the interfering wireless signal at a level that is determined not to interfere within the protected wireless zone. In this manner, the process 500 may granularly tune the interference mitigation activities using real-time feedback of signal measurements at the boundary of the protected wireless zone.

The process 500 iterates between decision point 524 and the processing at block 526 until the interference is determined to be effectively mitigated. In response to determining at decision point 524 that the interference has been mitigated, the process 500 begins iterative processing to process messages received via one or more mutual non-interference feedback loops implemented between the protected wireless zone and one or more neighboring protected wireless networks.

It should be noted that additional processing may be performed by the process 500 to identify and request neighboring wireless protection zones to reduce emitted power of wireless signaling using a mutual non-interference feedback loop message that has been received, as described above. This additional processing is not illustrated within the process 500 in order to describe reception of messages via a mutual non-interference feedback loop in more detail. However, it should be understood that this type of processing is considered to be a part of the process 500 and within the scope of the present description. It should further be understood that the processing described below regarding receipt of mutual non-interference feedback loop messages may be implemented by a neighboring protected zone responsive to a request initiated by the process 500.

At decision point 528, the process 500 makes a determination as to whether a message has been received from a neighboring wireless network that emits the incoming wireless signal. As described above, messaging may be implemented using a mutual non-interference feedback loop between neighboring routers/wireless networks, and the received message may be considered a mutual non-interference feedback loop message for purposes of the present description. In response to determining that a message has not been received from the neighboring wireless network that emits the incoming wireless signal, the process 500 makes a determination at decision point 530 as to whether the detected interference has been terminated at its source. Termination of incoming wireless interference may occur for a variety of reasons, such as by a wireless router being turned off, by a neighboring mobile wireless device that emits the interfering wireless signaling being moved to a location further away from the protected zone, or otherwise as appropriate for a given implementation. The process 500 iterates between decision point 528 and decision point 530 until an affirmative determination is made at either decision point.

In response to determining at decision point 528 that a message has been received from the neighboring wireless network that emits the incoming wireless signal, at block 532 the process 500 determines whether the message indicates that the emitted directional opposing outgoing wireless signal is interfering with an ability of a neighboring wireless computing device to connect to the neighboring wireless network within a boundary of the neighboring wireless network. In the present example, it is presumed that it is determined that the message indicates that the emitted directional opposing wireless signal is interfering with the ability of the neighboring wireless computing device to connect to the neighboring wireless network within the boundary of the neighboring wireless network. Again, this determination may be based upon mutual interference mitigation feedback from the neighboring wireless network that emits the incoming interfering wireless signal using the mutual interference mitigation feedback loop implemented between the neighboring wireless network and the wireless zone protection system.

At block 534, the process 500 may again determine a location of one or more local/protected wireless computing devices relative to a source location of the neighboring wireless network that emits the interfering wireless signal. By determining the location of the local/protected wireless computing devices relative to a source location of the neighboring wireless network, the emitted directional opposing signal may be further tuned to reduce power of the emitted directional opposing wireless signal.

At block 536, the process 500 instructs the respective boundary transceiver(s) to dynamically and incrementally reduce the emitted power level of the emitted directional opposing wireless signal to reduce impacts of the emitted directional outgoing opposing wireless signal on the neighboring wireless network while still preventing the incoming interfering wireless signal from further interfering with the ability of the local/protected wireless computing devices to connect to the protected wireless network within the boundary of the protected wireless network. As described above, this processing to dynamically and incrementally reduce the emitted power level of the emitted directional outgoing opposing wireless signal may be based upon a message received from the neighboring wireless network, and again the message may be considered to have been received as part of a mutual interference mitigation feedback loop established between neighboring wireless networks. Further, in view of the use of location of the local/protected wireless computing devices, the dynamic adjustment of the power level of the emitted directional outgoing opposing wireless signal may be based upon the determined location of the local/protected wireless computing device(s) relative to the source location of the neighboring wireless network that emits the incoming interfering wireless signal.

At decision point 538, the process 500 makes a determination as to whether the neighboring wireless network is operative for its intended purpose within its protected boundaries (i.e., is the neighboring wireless network okay). This processing may be responsive to additional messaging from the neighboring wireless network over the mutual non-interference feedback loop.

In response to determining at decision point 538 that the neighboring wireless network is not operative for its intended purpose within its protected boundaries (not okay), the process 500 returns to block 536 to again instruct the respective boundary transceiver(s) to dynamically and incrementally reduce the emitted power level of the emitted directional opposing wireless signal until the neighboring network reports via the mutual non-interference feedback loop that the emitted directional opposing wireless signal is no longer interfering with the intended operations of the neighboring wireless network within its protected boundaries.

In response to determining at decision point 538 that the neighboring network has reported that it is again operative for its intended purpose within its protected boundaries, the process 500 returns to decision point 530 and iterates as described above. Returning to the description of decision point 530, in response to determining that the detected interference has been terminated, the process 500 returns to decision point 502 described above in association with FIG. 5A, as represented by the circled letter "B" in each drawing.

As such, the process 500 implements control of boundary transceivers to pan and detect incoming wireless signaling to form a protected wireless zone, and processes incoming wireless signal information received from the boundary transceivers to determine whether any detected incoming wireless signals are interfering with the protected wireless network within the intended boundaries of the protected wireless network. The process 500 programmatically derives a source location of the interfering wireless signal based upon the cancellation bearings received from the respective boundary transceivers, and determines which of the boundary transceivers may effectively mitigate the interference within the protected wireless zone caused by the interfering wireless signal without causing excessive impact on the utility of the interfering wireless signal outside of the protected wireless zone. The process 500 instructs the boundary transceivers to emit a directional opposing wireless signal to mitigate the local interference caused by the interfering wireless signal. The process 500 further performs processing using a detected power level of the interfering signal at the boundary of the protected wireless zone, using a mutual non-interference feedback loop, and using a location of local/protected wireless computing devices to tune the emitted power level of the directional opposing wireless signal to further minimize the impact of the local zone protection activities on neighboring wireless networks.

As described above in association with FIG. 1 through FIG. 5B, the example systems and processes provide selective directional mitigation of wireless signal interference. Many other variations and additional activities associated with selective directional mitigation of wireless signal interference are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    monitoring a boundary of a wireless network for incoming wireless signals that may interfere with an ability of a first wireless computing device to connect to the wireless network within the boundary of the wireless network; and
    for an incoming wireless signal determined to interfere with the ability of the first wireless computing device to connect to the wireless network within the boundary of the wireless network, emitting a directional opposing outgoing wireless signal to counteract the incoming wireless signal and to stop the incoming wireless signal from further interfering with the ability of the first wireless computing device to connect to the wireless network within the boundary of the wireless network;
    where monitoring the boundary of the wireless network for incoming wireless signals that may interfere with the ability of the first wireless computing device to connect to the wireless network within the boundary of the wireless network comprises:
        instructing a plurality of boundary transceivers to scan a three-dimensional (3D) region that surrounds the boundary of the wireless network and to identify the incoming wireless signals that may interfere with the ability of the first wireless computing device to connect to the wireless network within the boundary of the wireless network.

2. The computer-implemented method of claim 1, where emitting the directional opposing outgoing wireless signal comprises emitting, in a direction of a source location from which the incoming wireless signal is being generated, an inverted directional signal that is out of phase relative to a phase of the incoming wireless signal and that is at a power level determined to be sufficient to counteract the incoming wireless signal within the wireless network.

3. The computer-implemented method of claim 2, where the determined power level comprises a power level equivalent to a detected power level of the incoming wireless signal at the boundary of the wireless network.

4. The computer-implemented method of claim 1, further comprising:
    receiving, from a neighboring wireless network that emits the incoming wireless signal, a message that indicates that the emitted directional opposing outgoing wireless signal is interfering with an ability of a second neighboring wireless computing device to connect to the neighboring wireless network within a boundary of the neighboring wireless network; and
    dynamically reducing, based upon the message received from the neighboring wireless network, a power level of the emitted directional opposing outgoing wireless signal to reduce impacts of the emitted directional opposing outgoing wireless signal on the neighboring wireless network while still stopping the incoming wireless signal from further interfering with the ability of the first wireless computing device to connect to the wireless network within the boundary of the wireless network.

5. The computer-implemented method of claim 1, further comprising:
    determining a location of the first wireless computing device relative to a source location of a neighboring wireless network that emits the incoming wireless signal; and
    dynamically adjusting a power level of the emitted directional opposing outgoing wireless signal based upon the determined location of the first wireless computing device relative to the source location of the neighboring wireless network that emits the incoming wireless signal.

6. The computer-implemented method of claim 1, further comprising:
    determining, based upon incoming signal information received from at least one of the plurality of boundary transceivers, a direction of propagation of the incoming wireless signal as detected by the respective at least one of the plurality of boundary transceivers, where the received incoming signal information comprises a respective detected power level of the incoming wireless signal at a respective location of each of the at least one of the plurality of boundary transceivers and a respective three-dimensional (3D) cancellation bearing relative to each of the at least one of the plurality of boundary transceivers; and
    instructing, for each of the at least one of the plurality of boundary transceivers for which the detected direction of propagation of the incoming wireless signal is determined, the respective boundary transceiver to emit the directional opposing outgoing wireless signal along the respective 3D cancellation bearing at the respective detected power level of the incoming wireless signal to counteract the incoming wireless signal.

7. A system, comprising:
    a plurality of boundary transceivers; and
    at least one processor programmed to:
        monitor a boundary of a wireless network for incoming wireless signals that may interfere with an ability of a first wireless computing device to connect to the wireless network within a boundary of the wireless network; and for an incoming wireless signal determined to interfere with the ability of the first wireless computing device to connect to the wireless network within the boundary of the wireless network, emit via at least one of the plurality of boundary transceivers a directional opposing outgoing wireless signal to counteract the incoming wireless signal and to stop the incoming wireless signal from further interfering with the ability of the first wireless computing device to connect to the wireless network within the boundary of the wireless network;

where, in being programmed to monitor the boundary of the wireless network for incoming wireless signals that may interfere with the ability of the first wireless computing device to connect to the wireless network within the boundary of the wireless network, the at least one processor is programmed to:

instruct the plurality of boundary transceivers to scan a three-dimensional (3D) region that surrounds the boundary of the wireless network and to identify the incoming wireless signals that may interfere with the ability of the first wireless computing device to connect to the wireless network within the boundary of the wireless network.

8. The system of claim 7, where, in being programmed to emit via at least one of the plurality of boundary transceivers the directional opposing outgoing wireless signal, the at least one processor is programmed to emit, in a direction of a source location from which the incoming wireless signal is being generated, an inverted directional signal that is out of phase relative to a phase of the incoming wireless signal and that is at a power level determined to be sufficient to counteract the incoming wireless signal within the wireless network.

9. The system of claim 8, where the determined power level comprises a power level equivalent to a detected power level of the incoming wireless signal at the boundary of the wireless network.

10. The system of claim 7, where the at least one processor is further programmed to:

receive, from a neighboring wireless network that emits the incoming wireless signal, a message that indicates that the emitted directional opposing outgoing wireless signal is interfering with an ability of a second neighboring wireless computing device to connect to the neighboring wireless network within a boundary of the neighboring wireless network; and dynamically reduce, based upon the message received from the neighboring wireless network, a power level of the emitted directional opposing outgoing wireless signal to reduce impacts of the emitted directional opposing outgoing wireless signal on the neighboring wireless network while still stopping the incoming wireless signal from further interfering with the ability of the first wireless computing device to connect to the wireless network within the boundary of the wireless network.

11. The system of claim 7, where the at least one processor is further programmed to:

determine a location of the first wireless computing device relative to a source location of a neighboring wireless network that emits the incoming wireless signal; and dynamically adjust a power level of the emitted directional opposing outgoing wireless signal based upon the determined location of the first wireless computing device relative to the source location of the neighboring wireless network that emits the incoming wireless signal.

12. The system of claim 7, where the at least one processor is further programmed to:

determine, based upon incoming signal information received from at least one of the plurality of boundary transceivers, a direction of propagation of the incoming wireless signal as detected by the respective at least one of the plurality of boundary transceivers, where the received incoming signal information comprises a respective detected power level of the incoming wireless signal at a respective location of each of the at least one of the plurality of boundary transceivers and a respective three-dimensional (3D) cancellation bearing relative to each of the at least one of a plurality of boundary transceivers; and instruct, for each of the at least one of the plurality of boundary transceivers for which the detected direction of propagation of the incoming wireless signal is determined, the respective boundary transceiver to emit the directional opposing outgoing wireless signal along the respective 3D cancellation bearing at the respective detected power level of the incoming wireless signal to counteract the incoming wireless signal.

13. A computer program product, comprising:

a computer readable storage medium having computer readable program code embodied therewith, where the computer readable storage medium is not a transitory signal per se and where the computer readable program code when executed on a computer causes the computer to:

monitor a boundary of a wireless network for incoming wireless signals that may interfere with an ability of a first wireless computing device to connect to the wireless network within the boundary of the wireless network; and for an incoming wireless signal determined to interfere with the ability of the first wireless computing device to connect to the wireless network within the boundary of the wireless network, emit a directional opposing outgoing wireless signal to counteract the incoming wireless signal and to stop the incoming wireless signal from further interfering with the ability of the first wireless computing device to connect to the wireless network within the boundary of the wireless network;

where, in causing the computer to monitor the boundary of the wireless network for incoming wireless signals that may interfere with the ability of the first wireless computing device to connect to the wireless network within the boundary of the wireless network, the computer readable program code when executed on the computer causes the computer to:

instruct a plurality of boundary transceivers to scan a three-dimensional (3D) region that surrounds the boundary of the wireless network and to identify the incoming wireless signals that may interfere with the ability of the first wireless computing device to connect to the wireless network within the boundary of the wireless network.

14. The computer program product of claim 13, where, in causing the computer to emit the directional opposing outgoing wireless signal, the computer readable program code when executed on the computer causes the computer to emit, in a direction of a source location from which the incoming wireless signal is being generated, an inverted directional signal that is out of phase relative to a phase of the incoming wireless signal and that is at a power level determined to be sufficient to counteract the incoming wireless signal within the wireless network.

15. The computer program product of claim 14, where the determined power level comprises a power level equivalent to a detected power level of the incoming wireless signal at the boundary of the wireless network.

16. The computer program product of claim 13, where the computer readable program code when executed on the computer further causes the computer to:
- receive, from a neighboring wireless network that emits the incoming wireless signal, a message that indicates that the emitted directional opposing outgoing wireless signal is interfering with an ability of a second neighboring wireless computing device to connect to the neighboring wireless network within a boundary of the neighboring wireless network; and
- dynamically reduce, based upon the message received from the neighboring wireless network, a power level of the emitted directional opposing outgoing wireless signal to reduce impacts of the emitted directional opposing outgoing wireless signal on the neighboring wireless network while still stopping the incoming wireless signal from further interfering with the ability of the first wireless computing device to connect to the wireless network within the boundary of the wireless network.

17. The computer program product of claim 13, where the computer readable program code when executed on the computer further causes the computer to:
- determine a location of the first wireless computing device relative to a source location of a neighboring wireless network that emits the incoming wireless signal; and
- dynamically adjust a power level of the emitted directional opposing outgoing wireless signal based upon the determined location of the first wireless computing device relative to the source location of the neighboring wireless network that emits the incoming wireless signal.

18. The computer program product of claim 13, where the computer readable program code when executed on the computer further causes the computer to:
- determine, based upon incoming signal information received from at least one of the plurality of boundary transceivers, a direction of propagation of the incoming wireless signal as detected by the respective at least one of the plurality of boundary transceivers, where the received incoming signal information comprises a respective detected power level of the incoming wireless signal at a respective location of each of the at least one of the plurality of boundary transceivers and a respective three-dimensional (3D) cancellation bearing relative to each of the at least one of the plurality of boundary transceivers; and
- instruct, for each of the at least one of the plurality of boundary transceivers for which the detected direction of propagation of the incoming wireless signal is determined, the respective boundary transceiver to emit the directional opposing outgoing wireless signal along the respective 3D cancellation bearing at the respective detected power level of the incoming wireless signal to counteract the incoming wireless signal.

* * * * *